(12) United States Patent
Kestie

(10) Patent No.: US 12,544,865 B2
(45) Date of Patent: Feb. 10, 2026

(54) WHEEL END REPAIR SYSTEM AND METHOD OF REPAIRING SAME

(71) Applicant: Kraig Kestie, Twin Falls, ID (US)

(72) Inventor: Kraig Kestie, Twin Falls, ID (US)

( * ) Notice: Subject to any disclaimer, the term of this patent is extended or adjusted under 35 U.S.C. 154(b) by 0 days.

(21) Appl. No.: 18/750,913

(22) Filed: Jun. 21, 2024

(65) Prior Publication Data

US 2024/0424622 A1     Dec. 26, 2024

Related U.S. Application Data

(60) Provisional application No. 63/522,340, filed on Jun. 21, 2023.

(51) Int. Cl.
    *B23P 6/00*            (2006.01)

(52) U.S. Cl.
    CPC ....................................... *B23P 6/00* (2013.01)

(58) Field of Classification Search
    CPC ...... B23P 6/00; B24B 5/363; Y10T 29/49748; Y10T 29/49728
    See application file for complete search history.

(56) References Cited

U.S. PATENT DOCUMENTS

| | | | | |
|---|---|---|---|---|
| 4,098,029 A * | 7/1978 | Shiets | ...................... | B24B 5/363 451/439 |
| 4,455,732 A * | 6/1984 | Shiets | .................... | B22D 19/10 29/402.06 |
| 4,792,080 A * | 12/1988 | Ferrari | .................... | B60B 35/14 228/49.3 |
| 4,820,089 A * | 4/1989 | Shiets | ...................... | B62D 7/16 29/402.06 |
| 5,125,146 A * | 6/1992 | Ferrari | ............... | B23K 37/0443 29/402.13 |
| 5,435,793 A * | 7/1995 | Varela | .................. | B60K 17/046 475/331 |
| 6,200,241 B1 * | 3/2001 | Pinotti | .................... | F16H 48/08 475/230 |
| 6,964,317 B2 * | 11/2005 | Groves | .................. | B60G 3/145 474/146 |
| 10,202,002 B2 * | 2/2019 | Carroll | .................. | B60B 35/025 |
| D848,906 S * | 5/2019 | Carroll | .................... | B60B 35/04 D12/160 |
| 10,308,070 B1 * | 6/2019 | Carroll | .................... | B60B 27/06 |
| 10,717,160 B2 * | 7/2020 | Ferrari | ...................... | B23P 6/04 |
| D914,550 S * | 3/2021 | Carroll | ........................ | D12/160 |
| 2004/0047708 A1 * | 3/2004 | Wang | ..................... | F16D 65/12 411/204 |
| 2022/0018404 A1 * | 1/2022 | Philpott | ............. | F16D 65/0056 |

* cited by examiner

*Primary Examiner* — Bayan Salone

(74) *Attorney, Agent, or Firm* — Lippes Mathias LLP

(57) ABSTRACT

A wheel end repair system or assembly to repair one of an associated brake backer plate or associated spindle of an associated vehicle is provided. The system can include legs joining a base plate to the brake backer plate mounted on an axle tube, and a crown is secured to the base plate to accurately position the spindle and the brake backer plate relative to one another, and retain the wheel end components in the desired locations so that the components can be tack welded and finally welded into position. The system can be used for an associated method of repairing either a damaged spindle or a damaged brake backer plate.

6 Claims, 20 Drawing Sheets

WHEEL END REPAIR SYSTEM AND METHOD OF REPAIRING SAME

CROSS-REFERENCE TO RELATED APPLICATION

This application claims priority from and benefit of the filing date of U.S. provisional application Ser. No. 63/522,340 filed Jun. 21, 2023, and the entire disclosure of said provisional application is hereby incorporated by reference into the present specification.

BACKGROUND

This disclosure relates to wheel end repair systems, and an associated method of repairing wheel ends.

On the end of each axle on most automotive vehicles including heavy trucks, light trucks, cars, campers, trailers, and recreational vehicles (RVs), etc., is a pointed metal surface called a spindle. The spindle holds seals and bearings in place which allow a wheel hub to rotate around the spindle. The hub is where the wheels bolt on to the vehicle allowing the wheels to rotate relative to the vehicle.

Also attached to the axle of the vehicle is the brake backer plate. The brake backer plate is where the brakes attach to the vehicle to apply leverage to make the wheels slow, and then stop when the brakes are applied. This entire area is commonly referred to as the wheel end or wheel end assembly.

When road conditions or lack of maintenance cause excess friction, damage can occur to the wheel end. Specifically, what was a recently free spinning wheel now becomes a non-functional or potentially even a dangerous condition.

Thus, a need exists for a system or an assembly (tool or tools) and method of repairing (i.e., removing and replacing) a wheel end, or more specifically repairing a spindle or a brake backer plate in a simple, repeatable, reliable, efficient, and/or cost-effective manner.

A need exists for an improved arrangement that provides at least one or more of the above-described features, as well as still other features and benefits.

SUMMARY

There is provided a wheel end interface tool (WEIT) system or assembly that allows repair (i.e., removal and/or replacement) of a damaged spindle or damaged brake backing plate, and an associated method of repairing the damaged spindle or damaged brake backing plate in a wheel end.

In one arrangement, the wheel end repair assembly includes a base plate having an opening therethrough dimensioned for receipt over an associated axle portion (associated spindle), and at least one retainer on the base plate. A spindle assembly jig/crown has an opening therethrough dimensioned for receipt over the associated axle portion, the jig/crown including at least one cam surface dimensioned for selective operative engagement with the retainer on the base plate. An engagement mechanism has a first end that engages the associated brake backer plate, and a second end that engages the base plate to accurately align the base plate relative to the associated brake backer plate.

In one embodiment, the at least one cam surface includes first, second, third, and fourth cam surface portions disposed in spaced relation on the jig/crown.

In that arrangement, the retainer can include first, second, third, and fourth retainer portions disposed in spaced relation on the base plate for selective mating engagement with the first, second, third, and fourth cam surface portions of the jig/crown, respectively.

The cam surface portions can be equi-spaced about the jig/crown and the retainer portions can likewise be equi-spaced about the base plate whereby the first, second, third, and fourth cam surface portions are oriented for selective mating engagement with the first, second, third, and fourth retainer portions, respectively.

The cam surface portions may be located along perimeter portions of the jig/crown, and each cam surface portion increases over an axial dimension as the cam surface portions extend along the perimeter portions, and more particularly the cam surface portions can be circumferentially spaced apart about a circular perimeter of the jig/crown.

The base plate may include a circular recess dimensioned to receive the circular perimeter of the jig/crown therein when the base plate is assembled to the jig/crown, whereby selective rotation of the jig/crown relative to the base plate positions the cam surface portions beneath corresponding retainer portions to axially join the base plate and jig/crown together.

The jig/crown may include first and second body portions selectively joined together with at least one fastener, and in one arrangement, the first and second body portions are substantially identical.

The repair assembly may include joining members that attach the base plate to the associated brake backer plate of the associated vehicle.

The engagement mechanism may include at least first and second legs each having a first end that engages the associated brake backer plate, and a second end that engages the base plate to accurately align the base plate relative to the associated brake backer plate.

A method of repairing a damaged spindle includes removing a wheel end; attaching a leg(s) to the brake backer plate; attaching a wheel end interface tool (WEIT) to the leg(s); marking the damaged spindle to ensure removal of the damaged spindle is done at the proper location/length; removing the leg(s) and WEIT; cutting the damaged spindle at the marked length; reattaching the leg(s) and WEIT to the brake backer plate; inserting a replacement spindle into the WEIT; tack welding the replacement spindle in place; removing the WEIT; welding the replacement spindle in place; and reinstalling the wheel end.

The WEIT attaching step may include attaching a WEIT base plate to the leg(s), and subsequently attaching a jig/crown to the WEIT base plate.

The method may further include attaching an alignment tool to the end of the replacement spindle to verify that the replacement spindle is in proper alignment.

The method may further include removing the WEIT crown, WEIT plate, and leg(s) from the replacement spindle and brake backer plate, and reattaching an alignment tool to the end of the replacement spindle to verify that the replacement spindle is in proper alignment.

A method of repairing a damaged brake backer plate can include removing a damaged brake backer plate from an axle tube; attaching a leg(s) to a replacement brake backer plate; attaching a wheel end interface tool (WEIT) to the leg(s); tack welding the replacement brake backer plate onto the axle tube; removing the WEIT and leg(s) from the replacement brake backer plate; welding the replacement brake backer plate to the axle tube; and reinstalling the wheel end.

The repairing method may include attaching a WEIT jig/crown to a WEIT base plate.

The replacement brake backer plate installing step may include sliding the replacement brake backer plate onto the spindle.

The brake backer plate installing step may include orienting a brake mechanism relative to the brake backer plate.

A primary advantage of the present assembly and associated method includes repairing either a damaged spindle or damaged brake backer plate of a wheel end.

Another benefit resides in providing a simple system for repairing either a damaged brake backer plate or damaged spindle of the wheel end.

Still another advantage is found in using many of the same components of the wheel end repair system or assembly (wheel end integration tool (WEIT) to repair either the damaged brake backer plate or damaged spindle of the wheel end.

Yet another benefit is associated with the repeatable and reliable results of using the wheel end repair system and associated method(s).

Still further, the present wheel end repair system and associated repair methods assist trained technicians in being more efficient and cost-effective.

Still other benefits and advantages of the present disclosure will become more apparent from reading and understanding the following detailed description.

DETAILED DESCRIPTION

Figure 1:
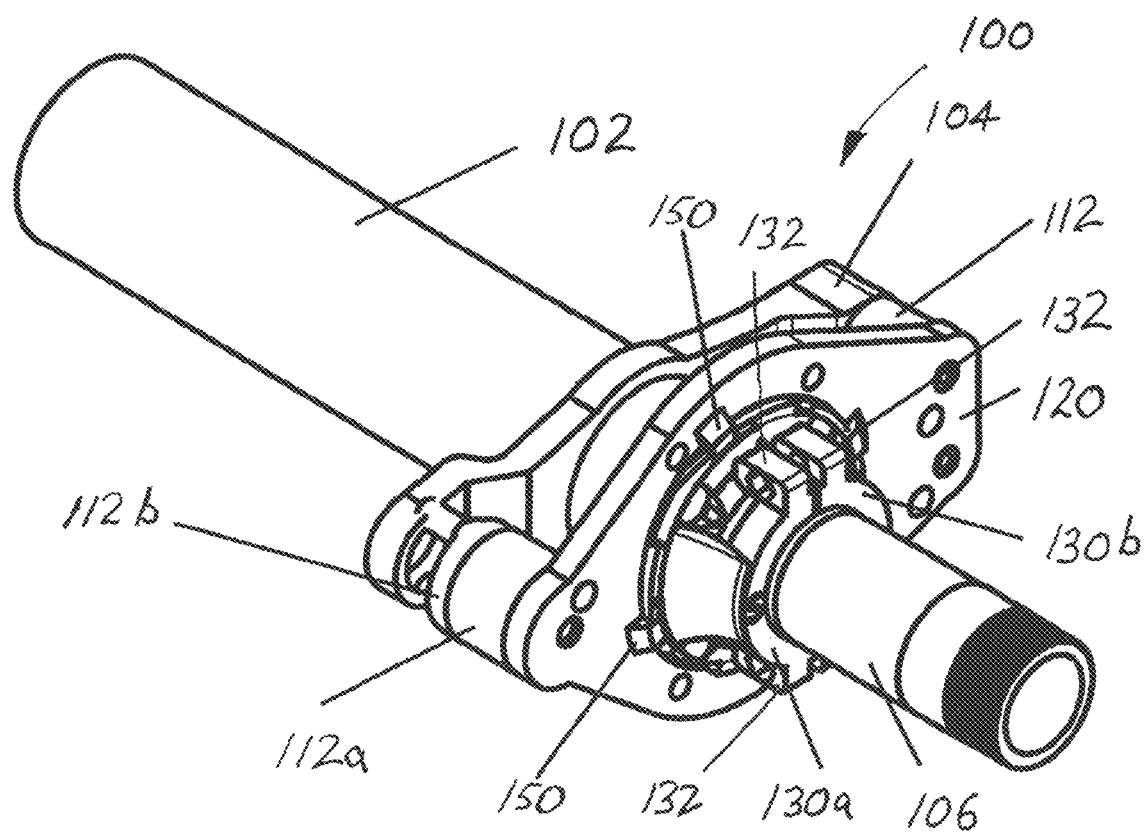
FIG. 1 is a perspective view of a wheel end repair system or assembly.
Figure 2:
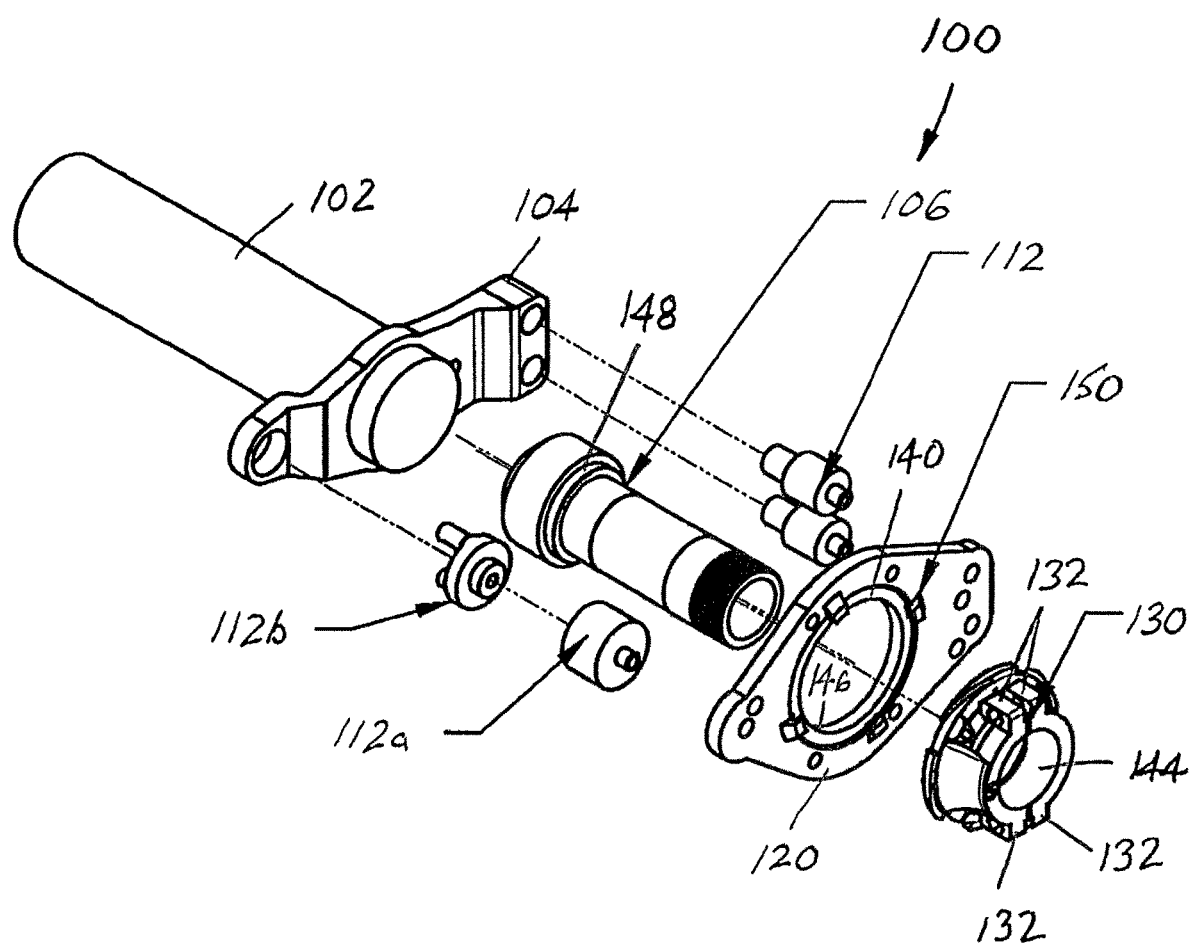
FIG. 2 is an exploded perspective view of the wheel end repair system of FIG. 1.
Figure 3:
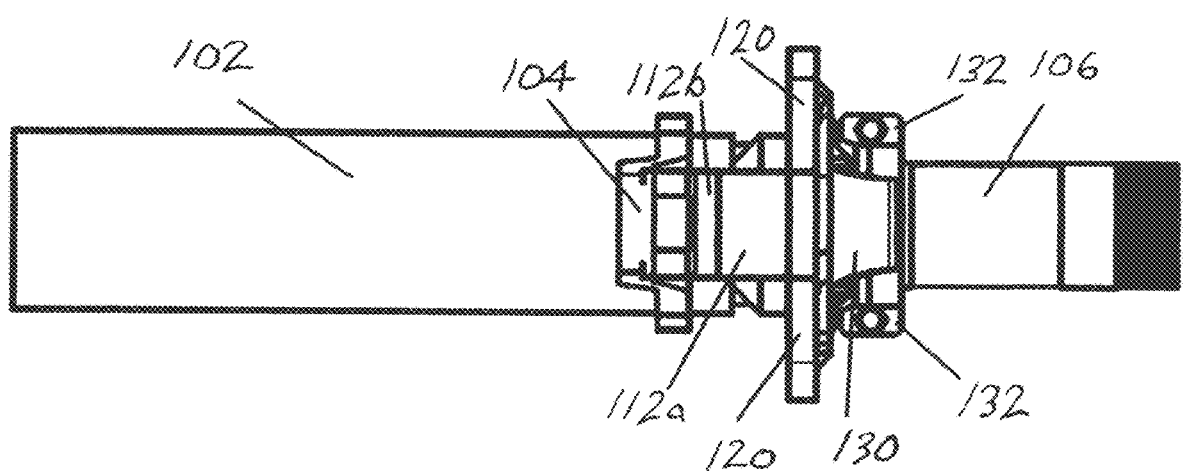
FIG. 3 is a side elevational view of the wheel end repair system of FIG. 1.
Figure 4:
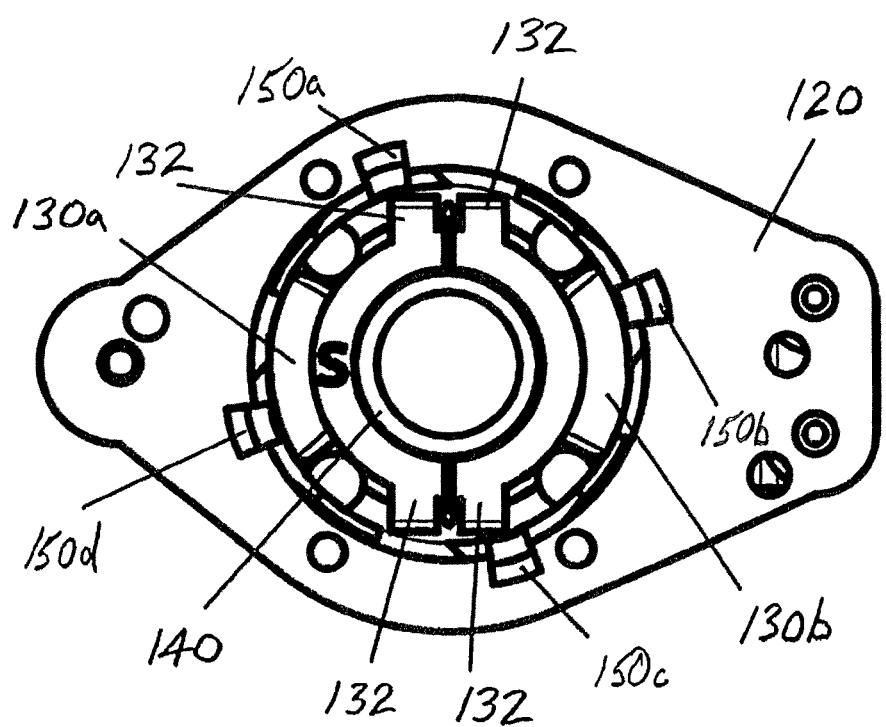
FIG. 4 is a front elevational view of the wheel end repair system of FIG. 1.

The following description with reference to the accompanying drawings is provided to assist in a comprehensive understanding of one or more embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. Various exemplary embodiments of the present disclosure are not limited to the specific details of different embodiments and should be construed as including all changes and/or equivalents or substitutes included in the ideas and technological scope of the appended claims. In describing the drawings, where possible similar reference numerals are used for similar elements.

The terms "include" or "may include" used in the present disclosure indicate the presence of disclosed corresponding functions, operations, elements, and the like, and do not limit additional one or more functions, operations, elements, and the like. In addition, it should be understood that the terms "include", "including", "have" or "having" used in the present disclosure are to indicate the presence of components, features, numbers, steps, operations, elements, parts, or a combination thereof described in the specification, and do not preclude the presence or addition of one or more other features, numbers, steps, operations, elements, parts, or a combination thereof.

The terms "or" or "at least one of A or/and B" used in the present disclosure include any and all combinations of words enumerated with them. For example, "A or B" or "at least one of A or/and B" mean including A, including B, or including both A and B.

Although the terms such as "first" and "second" used in the present disclosure may modify various elements of the different exemplary embodiments, these terms do not limit the corresponding elements. For example, these terms do not limit an order and/or importance of the corresponding elements, nor do these terms preclude additional elements (e.g., second, third, etc.) The terms may be used to distinguish one element from another element. For example, a first mechanical device and a second mechanical device all indicate mechanical devices and may indicate different types of mechanical devices or the same type of mechanical device. For example, a first element may be named a second element without departing from the scope of the various exemplary embodiments of the present disclosure, and similarly, a second element may be named a first element.

It will be understood that, when an element is mentioned as being "connected" or "coupled" to another element, the element may be directly connected or coupled to another element, and there may be an intervening element between the element and another element. To the contrary, it will be understood that, when an element is mentioned as being "directly connected" or "directly coupled" to another element, there is no intervening element between the element and another element.

The terms used in the various exemplary embodiments of the present disclosure are for the purpose of describing specific exemplary embodiments only and are not intended to limit various exemplary embodiments of the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having inconsistent or exaggerated meanings unless they are clearly defined in the various exemplary embodiments.

The present disclosure relates to a wheel end repair system/assembly or wheel end interface tool (WEIT). The WEIT is a series of tools that function to allow trained technicians to remove and replace damaged spindles or damaged brake backing plates of a wheel end. For spindle replacement, the WEIT can include leg(s) that attach to the brake backing plate, a base plate to align and hold individual components of the WEIT in place relative to the brake backing plate or spindle, and a top plate to hold the spindle in place while it is fitted and welded onto the axle end. If instead the brake backing plate is damaged and/or unserviceable, a reverse procedure can be used to measure the spindle end to install the replacement brake backing plate.

Tools involved allow a trained technician or repair person to properly measure the damaged spindle or remove the damaged brake backer plate. The technician can then remove the appropriate damaged equipment at the proper location. The technician can prepare the axle end, and secure or fasten the appropriate components or tools of the wheel end repair system to the existing axle tube, and weld the new equipment into place.

Similarly, with new braking technology being released, old style brake "spiders" can be removed and replaced with upgraded disc brake technology. Likewise, conversions can be made to drum brakes for heavy and/or off-road applications when disc brakes may not be appropriate.

More specifically, and turning initially to FIGS. 1-4, there is shown an embodiment of a wheel end repair system (or sometimes referred to as a wheel end repair assembly) 100. Details of a conventional wheel end are well known in the art and have been removed for ease of illustration, and it is understood that the wheel end repair system 100 finds particular use in repairing two common problems, i.e., either a damaged spindle or a damaged brake backing plate. The repair system 100 is used and dimensioned for temporary mounting receipt on an end of an associated axle portion 102 of an associated vehicle (not shown). The repair system 100 includes in some instances either (i) a replacement brake backer plate 104 that is mounted to an external surface of the associated axle portion 102 at an undamaged spindle 106; or alternatively the brake backer plate is not damaged or is not intended to be replaced, and the repair system includes a replacement spindle 106. As will become more apparent from the following description, the repair system 100 finds use in the methods associated with repair of either a damaged brake backing plate 104 or damaged spindle 106.

The repair system 100 further includes a wheel end interface tool (also referred to herein by the acronym WEIT) 110 that interconnects the brake backing plate 104 to the spindle 106, and/or facilitates proper alignment of the spindle with the brake backing plate. In an embodiment, the WEIT 110 includes one or more legs 112 that are mounted at one end to the brake backing plate 104 and at the other end to a base plate 120 (individually illustrated in FIGS. 5-8). The legs 112 may be similar as shown in the right-hand portion of FIG. 2, or the legs may be slightly modified as shown by the two-part leg portions 112a, 112b illustrated on the left-hand portion of FIG. 2. The different types of legs 112 or 112a/112b may be necessary to accommodate different mounting surface locations on, or different configurations of, the brake backing plate 104. Particularly, base plate 120 can include a recessed radial surface 140 formed by shoulder 142 (FIGS. 5 and 6) for reasons that will be described further below.

The WEIT 110 further includes a spindle assembly jig or crown 130 shown more specifically in FIGS. 9-13. The jig/crown 130 can be an annular component that includes split, first and second mating portions 130a, 130b at one end that may be tightened together when assembled (fastened) on the outer perimeter surface of the spindle 106. More particularly, the split crown portions 130a, 130b are desirably identical structures that allow interfit and mounting of the portions onto the outer surface of the spindle 106. For example, fastener receiving regions 132 are provided at diametrically opposite ends of crown portion 130a, and similarly fastener receiving regions 132 are provided at diametrically opposite ends of crown portion 130b. When the fastener receiving regions 132 of the first and second crown portions 130a, 130b are brought into abutting engagement after the crown 130 is axially located on the spindle 106, the cooperating split ends of the crown portions are urged toward one another and form an opening 144 that grips the outer surface of the spindle 106. Suitable fasteners such as bolts (not shown) may extend through either adjacent regions 132 for threaded receipt in a nut (not shown), or one of the faster receiving regions 132 may be internally threaded for cooperation with the external threads of a bolt. The fasteners tighten the split end portions of the crown.

Figure 5:
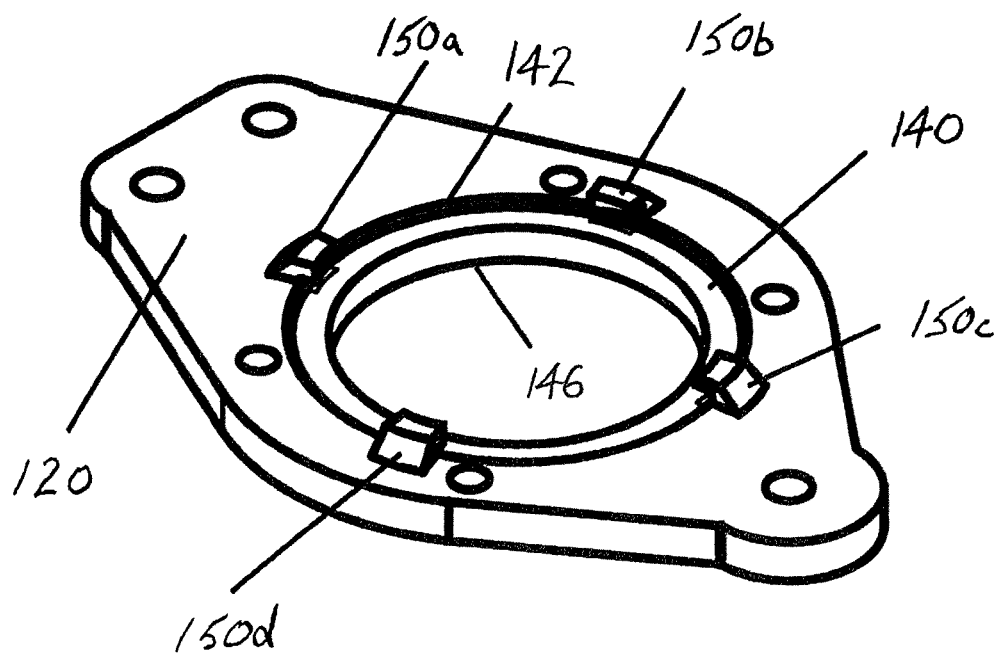
FIG. 5 is a perspective view of a base plate used in the wheel end repair system.
Figure 6:
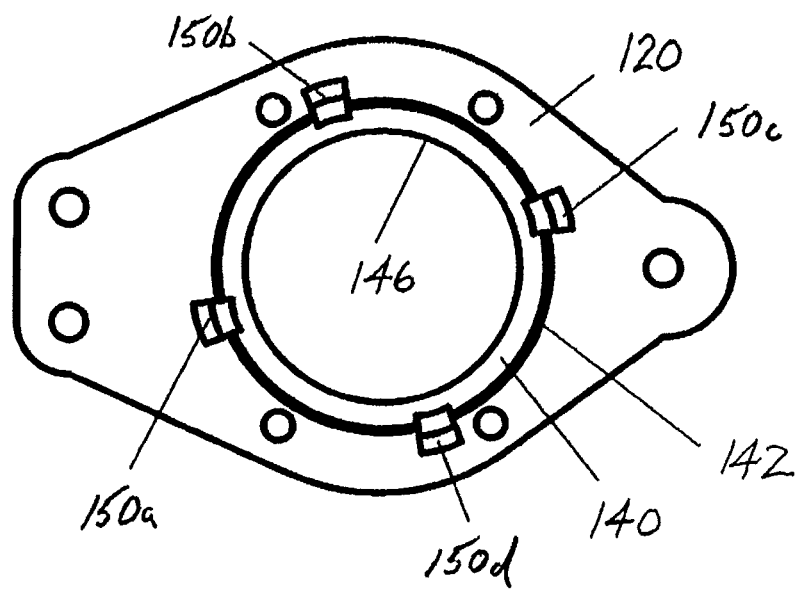
FIG. 6 is a top plan view of the base plate of FIG. 5.
Figure 7:
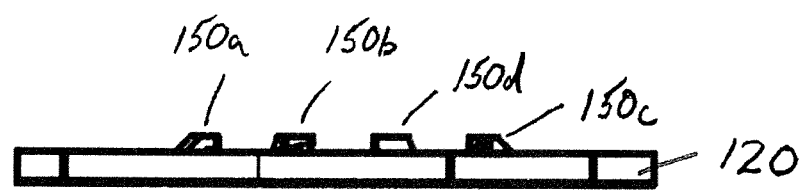
FIG. 7 is a side elevational view of the base plate of FIG. 5.
Figure 8:
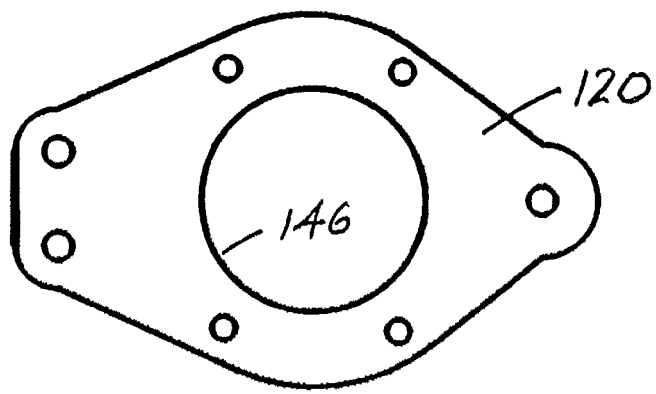
FIG. 8 is a bottom plan view of the base plate of FIG. 5.
Figure 9:
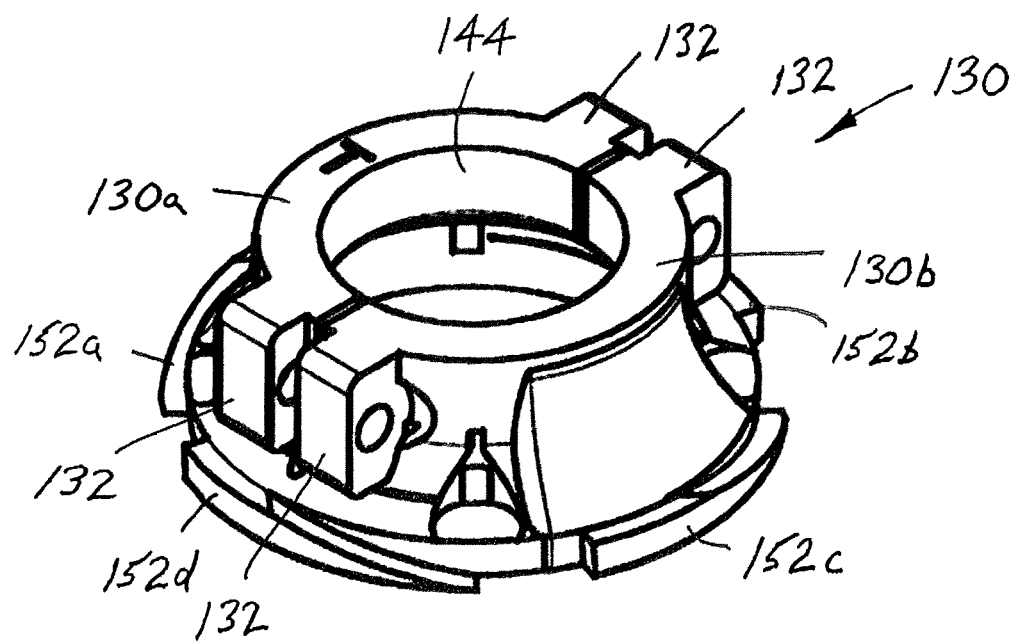
FIG. 9 is a perspective view of a spindle assembly jig, or wheel end integration tool crown, used with the base plate in the wheel end repair system.
Figure 10:
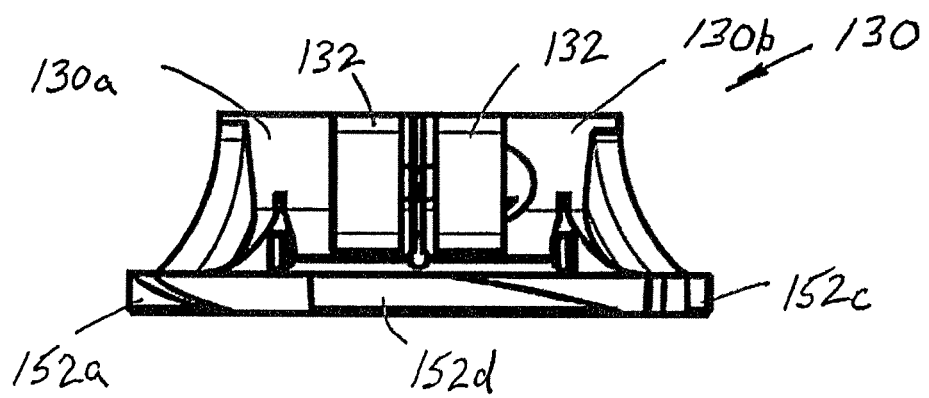
FIG. 10 is a side elevational view of the crown of FIG. 9.
Figure 11:
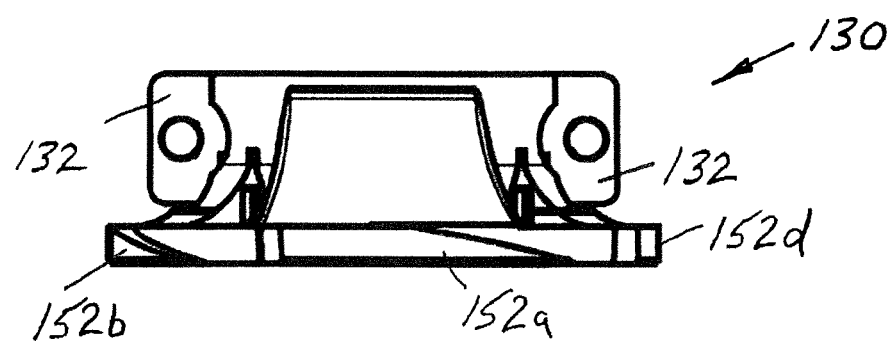
FIG. 11 is a front elevational view of the crown of FIG. 9.
Figure 12:
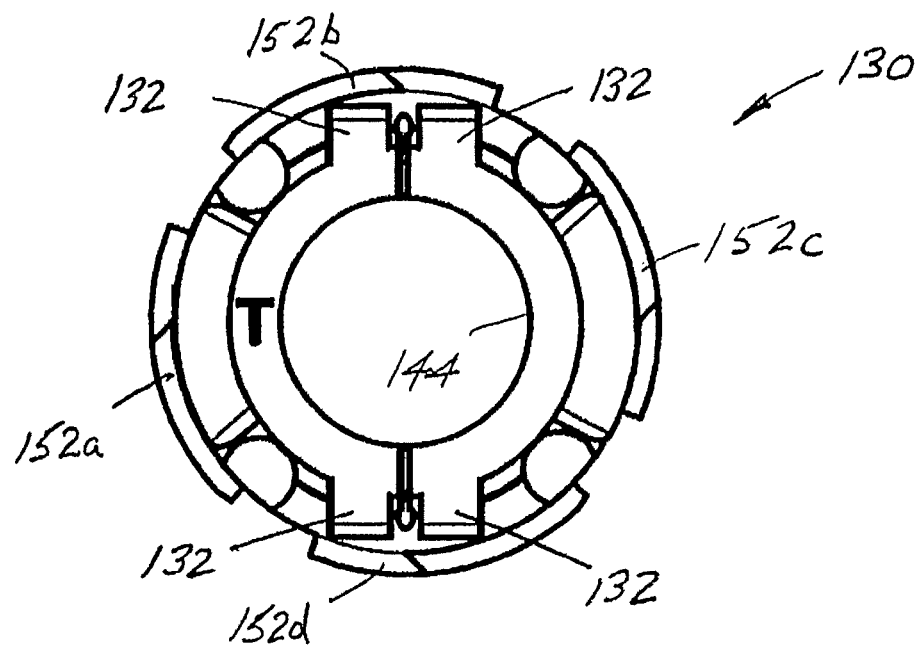
FIG. 12 is a top plan view of the crown of FIG. 9.
Figure 13:
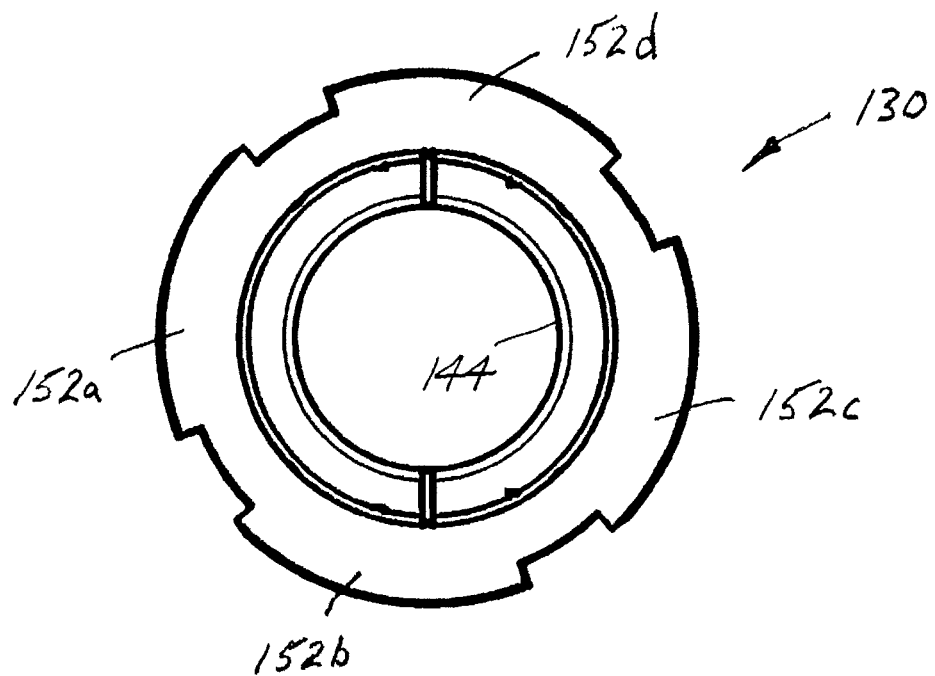
FIG. 13 is a bottom plan view of the crown of FIG. 9.

The base plate 120 and the jig/crown 130 are axially joined together by selectively rotating the assembled crown portions 130a, 130b relative to the base plate. Particularly, base plate 120 includes a recessed radial surface 140 formed by shoulder 142 (FIGS. 5 and 6). The shoulder 142 has a radial dimension that receives an outer diameter of the mating crown portions 130a, 130b when assembled together, particularly receiving a circular base region of the assembled crown 130. In this manner, the crown 130 is supported on the radial surface 140 and a through opening 144 of the crown is dimensioned for receipt on the outer surface of the spindle 106. Through opening 146 in the base plate 120, on the other hand, is received over a radially enlarged shoulder 148 (FIG. 2) of the spindle. As perhaps best illustrated in FIGS. 5 and 6, the base plate 120 includes at least one retainer that partially extend over the radial surface 140. In one arrangement, retainer 150 includes plural retainer portions 150a, 150b, 150c, 150d at circumferentially spaced locations that cooperate with cam surface 152, and particularly cooperate with individual circumferentially spaced cam surface portions 152a, 152b, 152c, 152d, respectively. Each cam surface portion 152a, 152b, 152c, 152d progressively increases in an axial dimension as the cam surface portions extend along the circumference of the crown 130 and as will be appreciated, each cam surface portion increases its axial dimension in the same manner as each of the other cam surface portions). Thus, the crown 130 is positioned over the spindle 106 and axially advanced toward the base plate 120. As the crown 130 is axially advanced, the cam surface portions 152a, 152b, 152c, 152d are circumferentially positioned between the respective retainer portions 150a, 150b, 150c, 150d on the base plate 120. Once the crown 130 abuts the radial surface 140 of the base plate 120, the crown is rotated relative to the base plate so that a leading edge of each cam surface portion 152*a*, 152*b*, 152*c*, 152*d* is positioned beneath the respective retainer portions 150*a*, 150*b*, 150*c*, 150*d* on the base plate. Continued rotation of the crown 130 relative to the base plate 120 advances the ever-increasing axial dimension of each cam surface portion 152*a*, 152*b*, 152*c*, 152*d* beneath the respective retainer portion 150*a*, 150*b*, 150*c*, 150*d* to thereby axially secure the crown to the base plate.

A description of each component and how the system functions are described below.

For damaged spindle replacement, a technician selects the proper set of legs 112 or 112*a*, 112*b* for the damaged spindle 106 and application. The legs 112 or 112*a*, 112*b* are attached to the brake backer plate 104 with the appropriate bolts.

Once the legs 112 or 112*a*, 112*b* are attached, the WEIT base plate 120 is attached to the legs. The damaged spindle 106 is measured and marked using existing data to ensure removal of the damaged spindle is done at the proper length.

The legs 112 or 112*a*, 112*b* and WEIT base plate 120 are removed to allow removal of the damaged spindle 106 for replacement.

The damaged spindle 106 is cut at the marked location/length and the technician prepares the end of the axle tube 102 to accept the replacement spindle.

Once the axle tube end is prepared, the leg(s) 112 or 112*a*, 112*b* are reattached and the WEIT base plate 120 is mounted to the brake backer plate 104.

The replacement spindle 106 is inserted into the WEIT jig/crown 130 assuring that the seal surface of the replacement spindle fits snuggly into the WEIT jig/crown.

The WEIT jig/crown 130 is attached to the WEIT base plate 120 (i.e., the crown is rotated into a secured position where the retaining portions 150*a*, 150*b*, 150*c*, 150*d* of the base plate retain the cam surface portions 152*a*, 152*b*, 152*c*, 152*d*, respectively, and the technician verifies that the wheel end components appear properly aligned.

An alignment tool, such as a laser alignment tool (not shown), is attached to the end of the replacement spindle 106 and the technician can verify that spindle is in proper alignment.

Next, the laser alignment tool is removed, and the technician tack welds the replacement spindle 106 in place.

The WEIT jig/crown 130, WEIT base plate 120, and leg(s) 112 or 112*a*, 112*b* are removed from the replacement spindle 106 and brake backer plate 104.

The laser alignment tool is reattached to the end of the replacement spindle 106 and the technician reverifies that the replacement spindle is in proper alignment. Once this is reverified, the laser alignment tool is removed and the technician proceeds to weld the replacement spindle 106.

Once the replacement spindle 106 has cooled to a proper temperature, remaining components of the wheel end can be reinstalled.

For replacement of a damaged brake backer plate 104, the technician ensures that the spindle surface 106 is clear of obstructions. The existing or damaged brake backer plate 104 is removed from the axle tube 102 and the axle tube is prepared to have the new or replacement brake backer plate installed.

Appropriate leg(s) 112 or 112*a*, 112*b* are attached to the new brake backer plate 104 with the appropriate bolts, and the WEIT base plate 120 is attached to the leg(s), and then the WEIT jig/crown 130 is attached to the WEIT base plate.

The entire new assembly is next slid onto the spindle 106. This will align the replacement brake backer plate 104 on the axle tube 102.

The entire assembly is properly oriented so that the cam tube or similar brake mechanism is correctly aligned into the brake backer plate 104.

The replacement brake backer plate 104 is tack welded onto the axle tube 102.

Subsequently, the WEIT jig/crown 130 is removed, along with the WEIT base plate 120, and leg(s) 112 or 112*a*, 112*b* from the replacement brake backer plate 104.

Next, the technician securely welds the replacement brake backer plate 104 in place.

Once cooled to proper temperature, remaining components of the wheel end are ready for reinstallation.

In summary, the wheel end integration tools (WEIT) 100 is a set of tools and associated methods/processes that allow a technician to remove and replace a damaged spindle 106 or a damaged brake backer plate 104 with precision and speed. This process has been greatly improved from other past methods of removing and replacing these items. The wheel end(s) of an axle on trucks and trailers (either heavy or light duty) include the brake backer plate 104 and the spindle 106. The brake backer plate 104 and the spindle 106 must be a specific distance apart (consistent axial spacing per repair application) to allow the wheel to spin freely on the spindle and for the brakes to function properly. If the distances are changed, this change can potentially adversely impair the free motion of the wheel to spin or for the brakes to function. The present WEIT allows for the repair part(s) to be precisely installed for these exacting measurements and alignment.

Each WEIT will include, but not be limited to, the following components pieces:

Leg(s) 112 or 112*a*, 112*b* (with appropriate fasteners, e.g., bolts);
WEIT base plate 120;
WEIT jig/crown 130; and
laser alignment tool with attachments (conventional—not shown).

Depending on the vehicle or trailer on which the replacement is occurring, and the part to be replaced, a specific set of tooling will be required.

Figure 14:
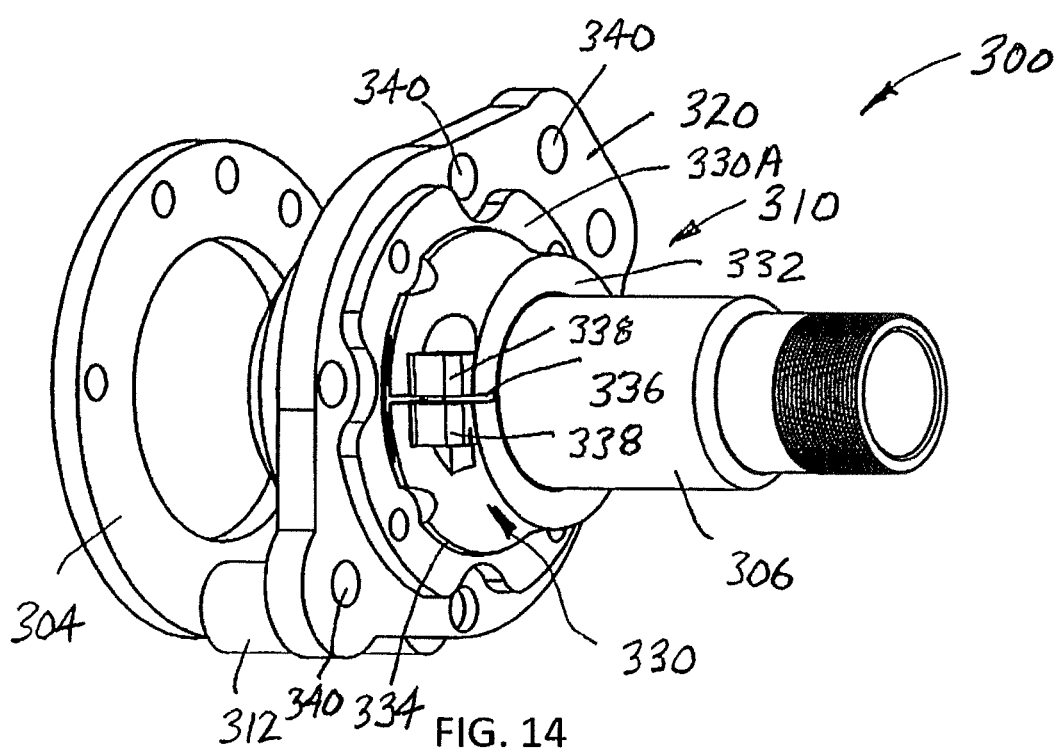
FIG. 14 is a perspective view of a different embodiment used in a wheel end repair system.
Figure 15:
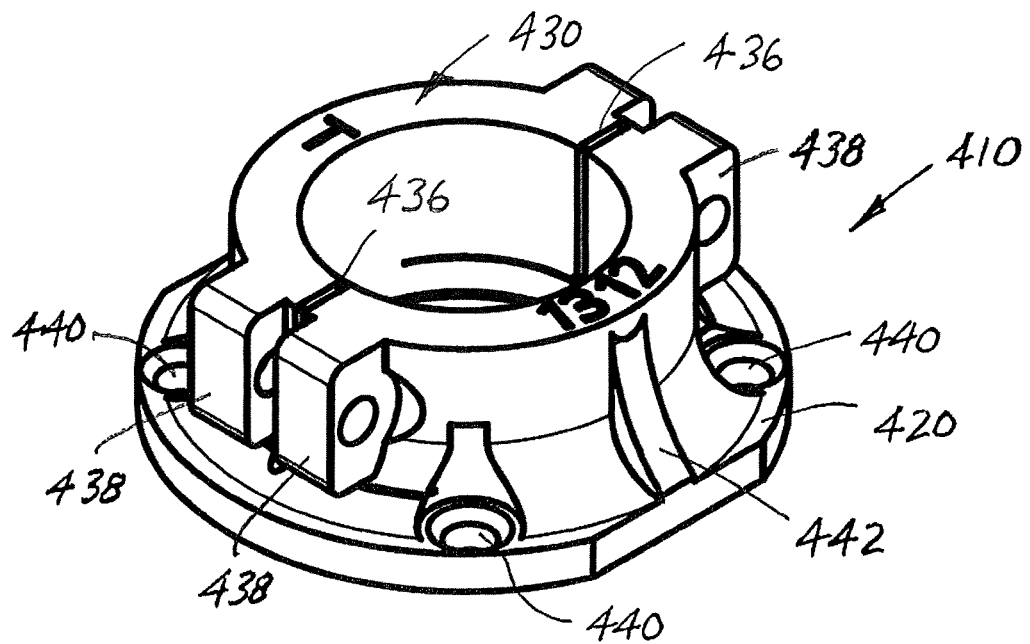
FIGS. 15-18 are perspective, top, front, and side views of another, integrated embodiment.
Figure 16:
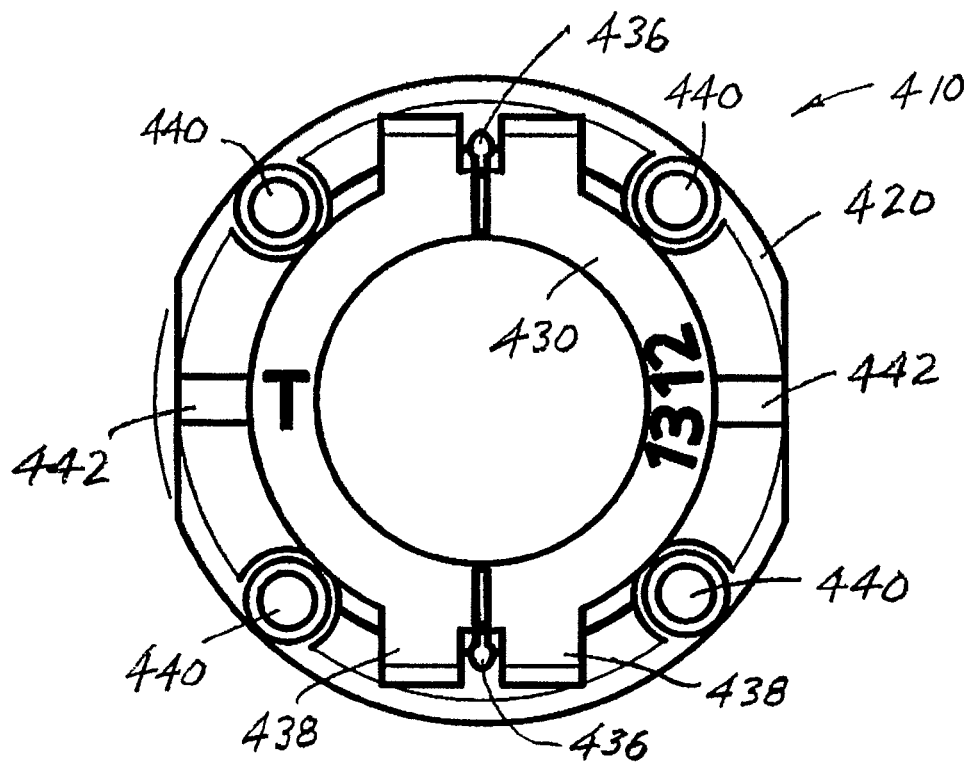
Figure 17:
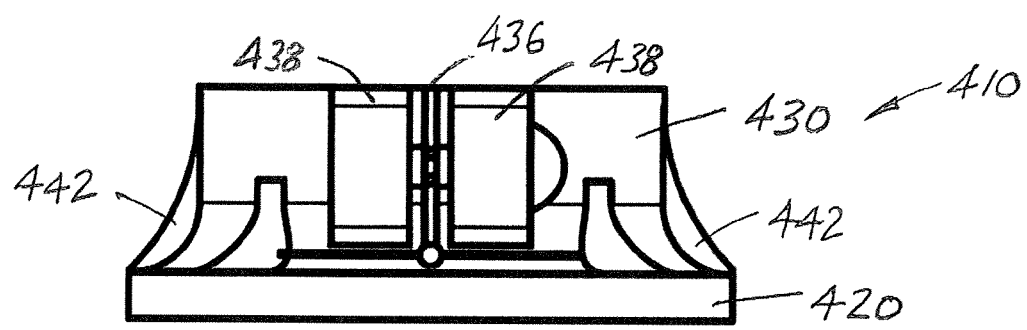
Figure 18:
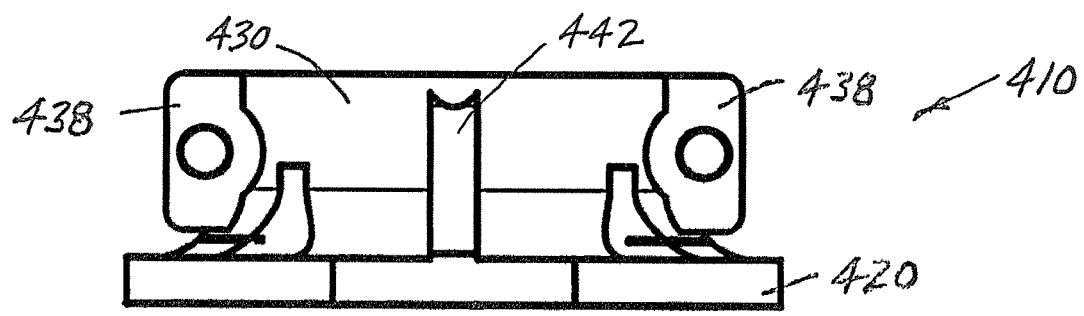
Figure 19:
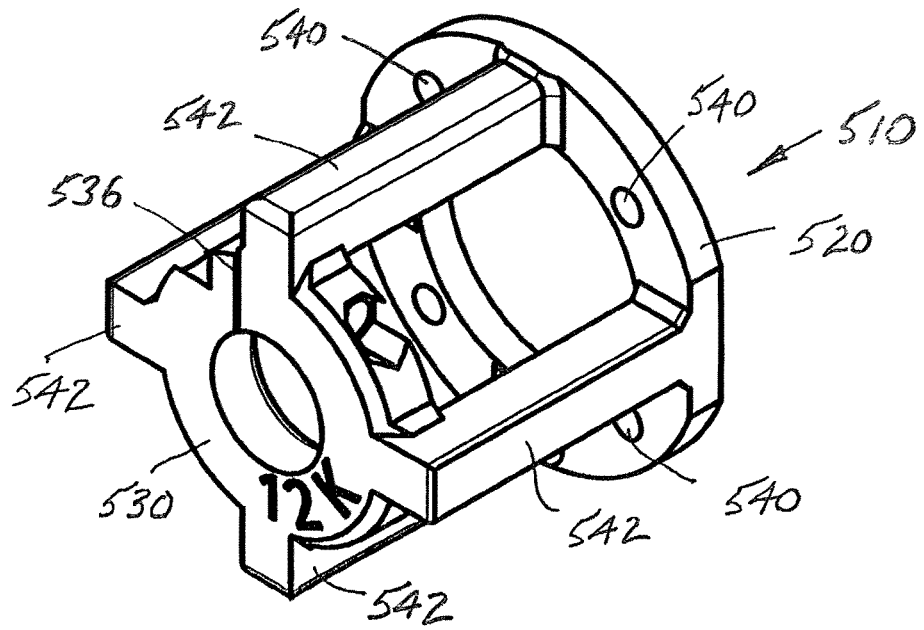
FIGS. 19-22 are perspective, front, side, and top views of still another, integrated embodiment.
Figure 20:
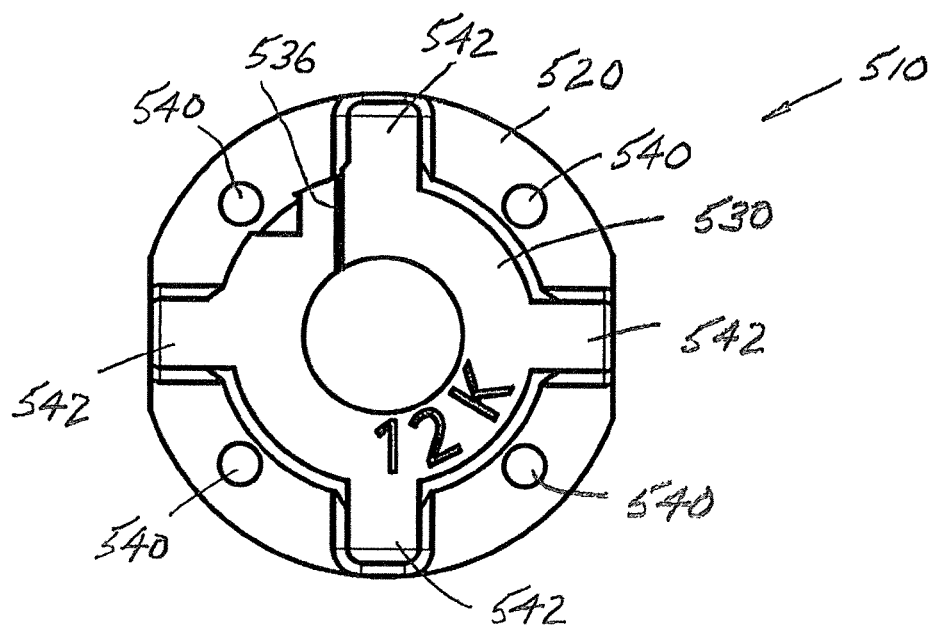
Figure 21:
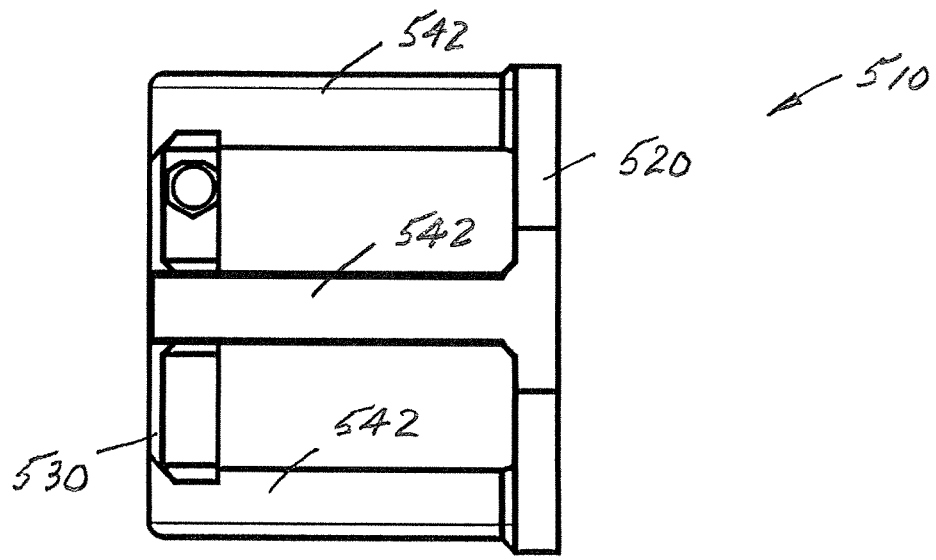
Figure 22:
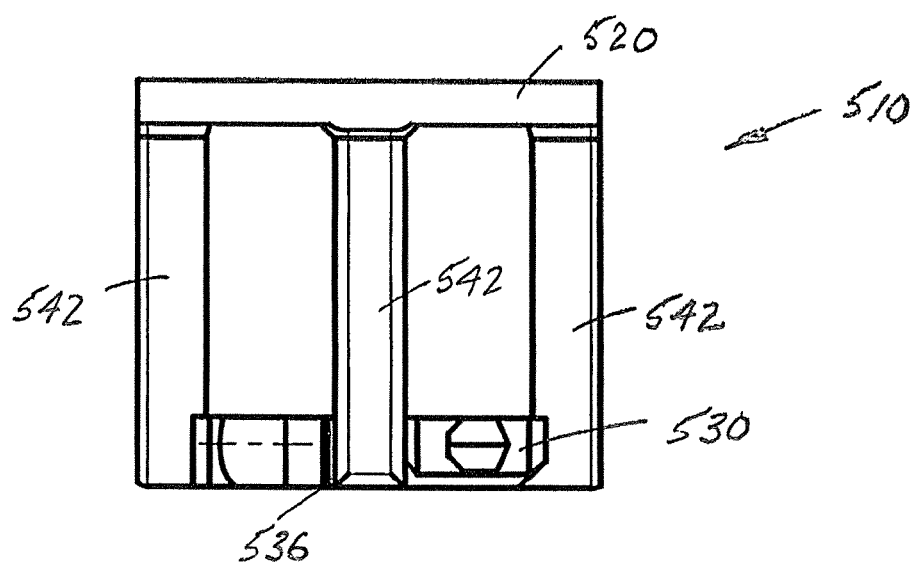

FIG. 14 shows one version of a modified repair system 300 that includes an integrated wheel end interface tool (WEIT) 310 that is used in connection with a brake backer plate 304 and spindle 306. More specifically, this version of the WEIT 310 interconnects the brake backing plate 304 to the spindle 306 to facilitate proper alignment of the spindle with the brake backing plate. One or more legs 312 extend between the brake backing plate 304 and a base plate 320 of the tool 302. A crown 330 has a generally annular dome or hemispherical conformation that enlarges in diameter from a first, smaller diameter end 332 toward a second, larger diameter end 334. The crown 330 is integrally formed with an integral base region 330A that is fastened to the base plate 320. By "integrated", it will be understood that the base region 330A and spindle assembly jig or crown 330 can be a single component. The base region 330A is generally planar and received in abutting engagement with the base plate 320.

This version of the WEIT 310 includes a single split 336 that extends radially partially or fully through the crown 330 and along the axial length of the crown. The split 336 has a sufficient dimension or spacing to allow the crown 330 and the remainder of the WEIT 310 to extend over the spindle 306. Once positioned in place, suitable fastener(s) such as a threaded bolt(s) (not shown) extend(s) through adjacent fastener receiving regions 338 of the crown 330 to tighten/close the inner dimension of the crown about the spindle

306. The one-piece WEIT 310 can be formed from a material that provides the desired qualities of strength, durability, rigidity, and yet sufficiently flexibility to allow the crown 330 to be selectively tightened by the fastener(s) about the spindle 306. In addition, suitable openings 340 are provided in the base region 330A of the crown 330 and base plate 320 to secure these components together, and to also secure the base plate to the brake backing plate 304 with fasteners and/or legs 312.

FIGS. 15-18 show a modified version of an integrated crown 430 where a base region thereof also serves as the base plate 420 of the wheel end interface tool (WEIT) 410. In this embodiment, the crown 430 has a generally cylindrical or collar-like conformation along an axial extent thereof and then is selectively enlarged over a remaining axial extent where the crown merges into the integrated base plate 420. Strengthening ribs 442 are provided on diametrically opposite portions of the crown to add further strength and rigidity to the component. In this arrangement, split 436 extends both radially and axially along a substantial height of the crown 430 and terminates before the integral base plate 420. Suitable fasteners such as first and second threaded bolts (not shown) extend(s) through adjacent fastener receiving regions 438 located on diametrically opposite sides of the crown 430 to tighten/close the inner dimension of the crown about the spindle (not shown). A plurality of openings 440 are spaced about the perimeter of the base plate portion 420 of the integrated component 410 to receive fasteners and/or legs that interconnect the integrated crown/baseplate with a brake backing plate (not shown).

FIGS. 19-22 illustrate another embodiment of a one-piece collar or dome 530/base plate 520 that includes elongated ribs or arms 542 integrally extending between the collar portion 530 and the base plate portion of 520 of wheel end interface tool 510. Each arm 542 can extend between the collar portion 530 and the base plate portion 520, with substantial openings or spacing provided between adjacent arms in the perimeter/circumferential direction of the WEIT 510.

Figure 23:
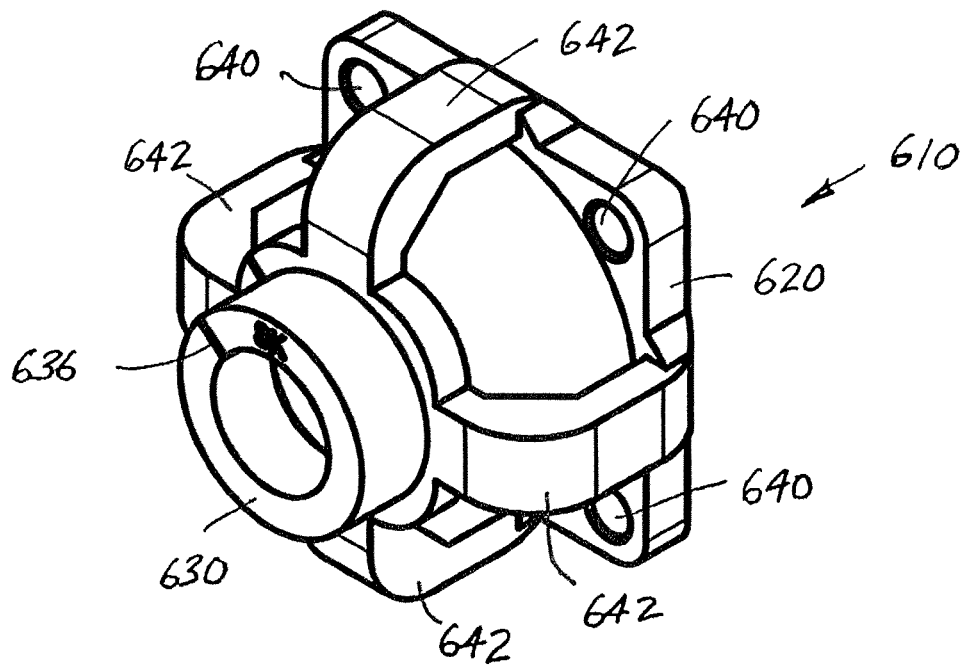
FIGS. 23 and 24 are perspective views of two further embodiments.
Figure 24:
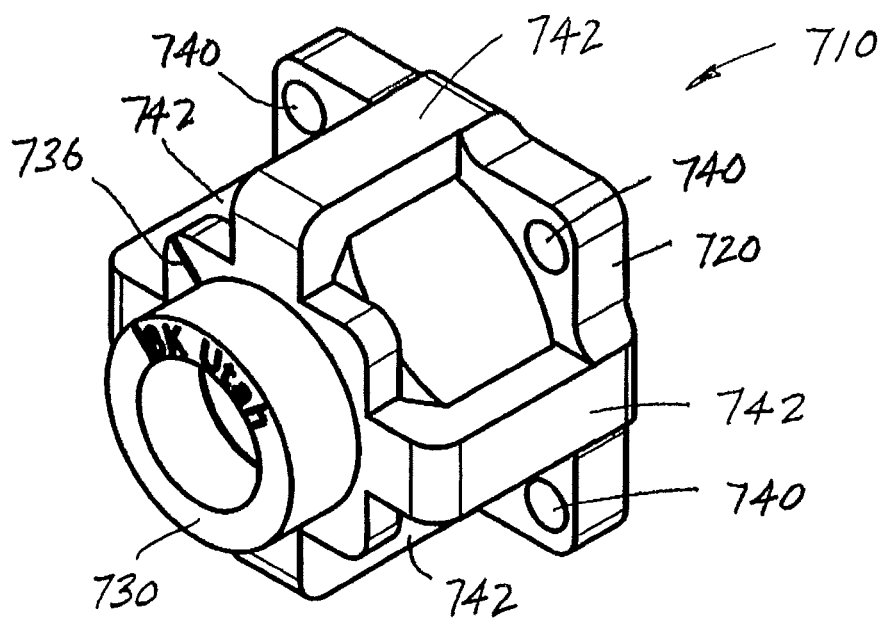
Figure 25:
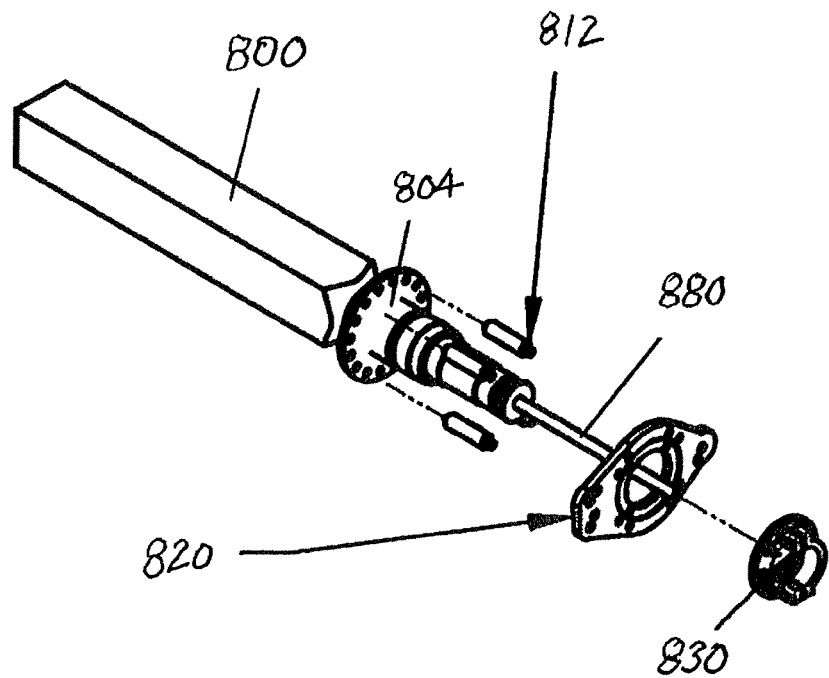
FIG. 25 is an exploded perspective view of a drive axle and the tools (spindle tools) of the present disclosure used in association with installation.
Figure 26:
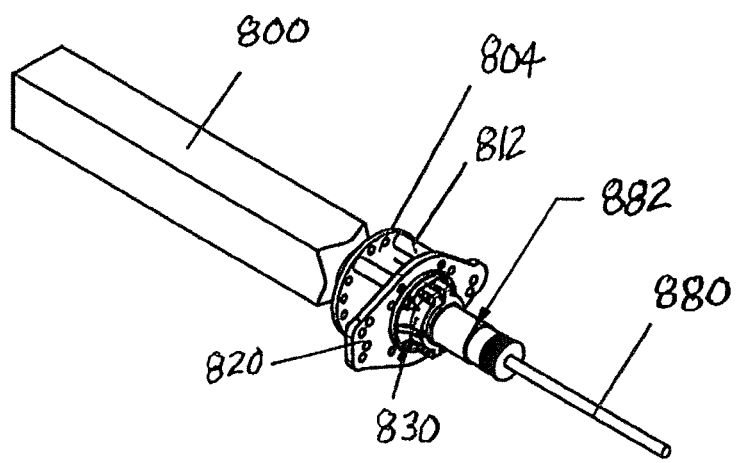
FIG. 26 is a perspective view of the assembled tools on the drive axle of FIG. 25.
Figure 27:
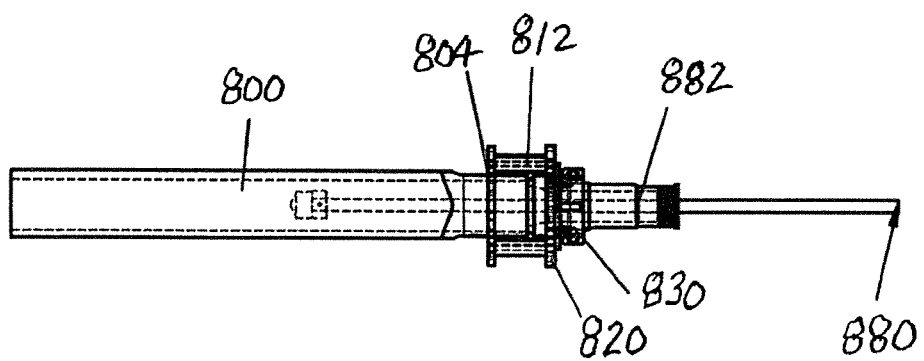
FIG. 27 is a side or elevational view of the assembled tools on the drive axle of FIG. 25.
Figure 28:
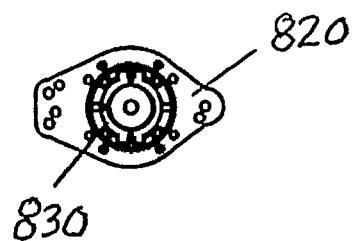
FIG. 28 is an end view taken from the righthand side of FIG. 27.
Figure 29A:
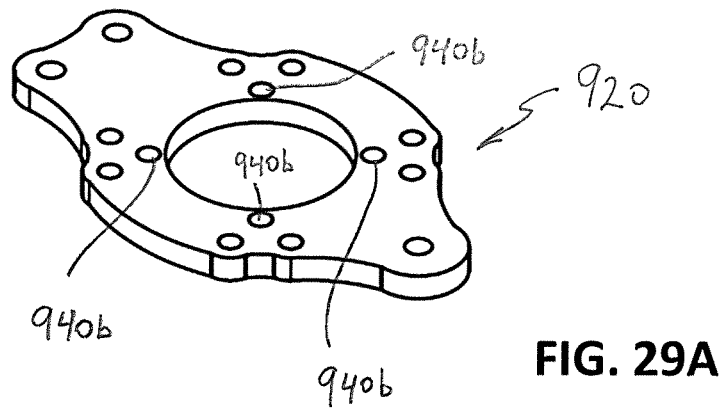
FIGS. 29A-31D disclose an alternative embodiments for the WEIT plate/base plate and crown.
Figure 29B:
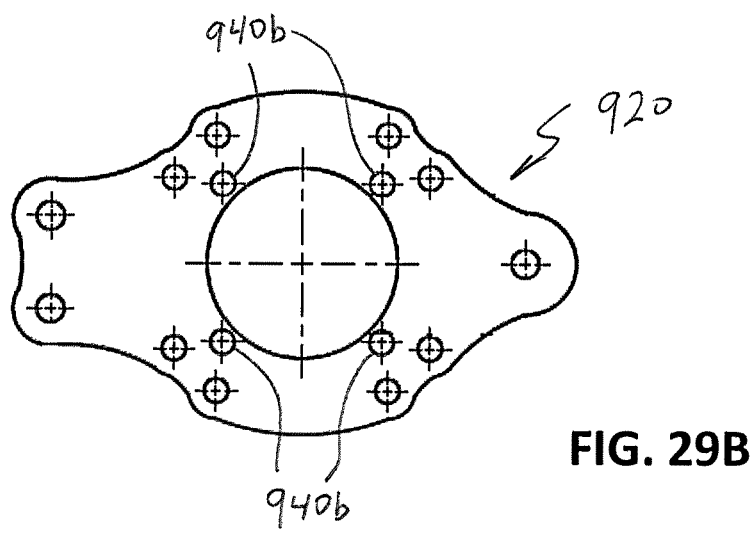
Figure 29C:
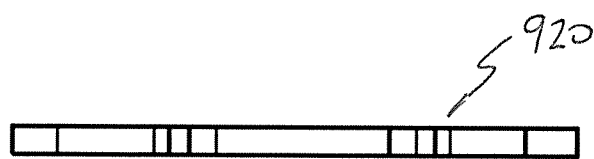
Figure 30A:
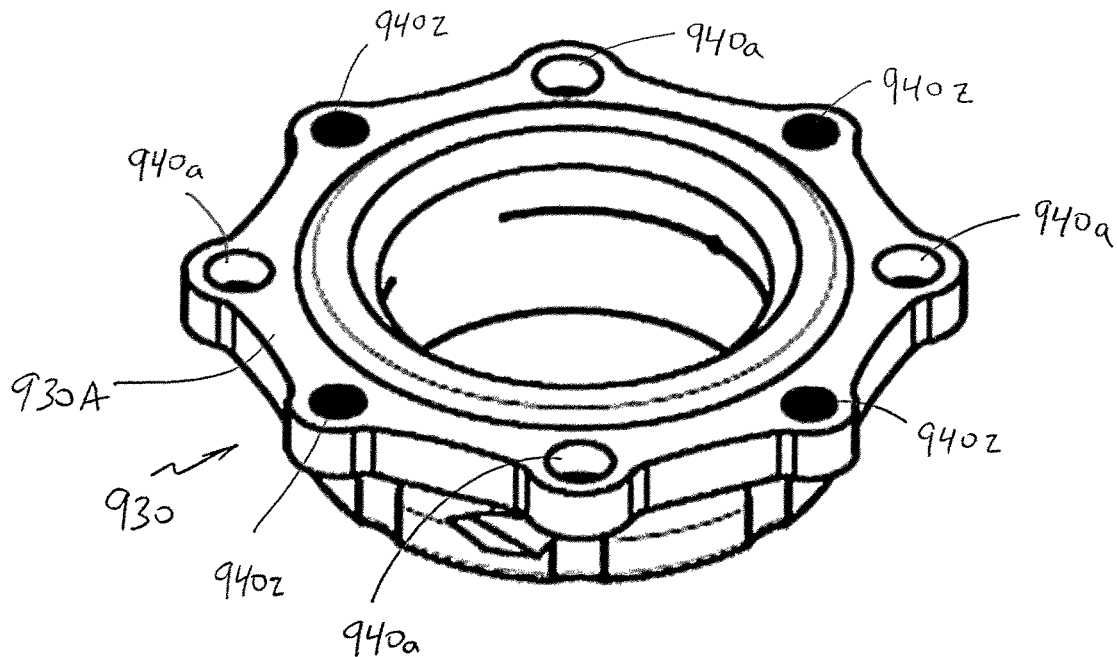
Figure 30B:
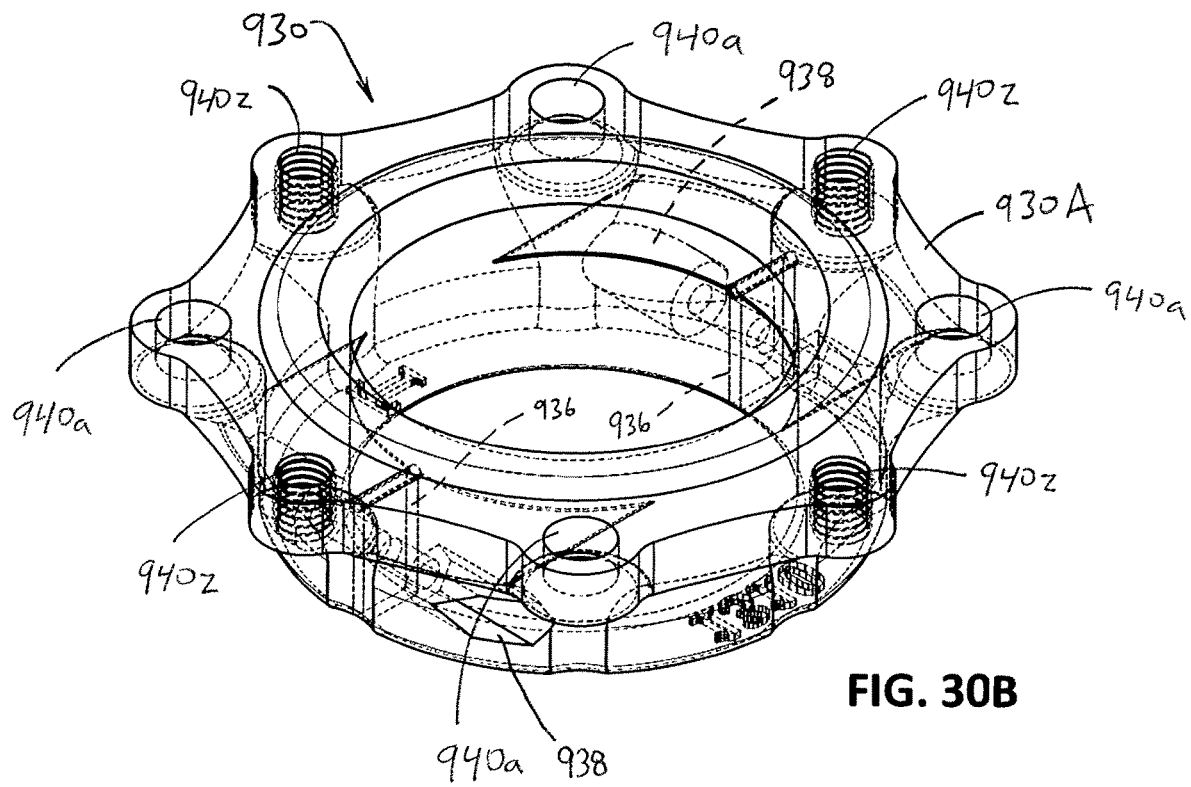
Figure 31A:
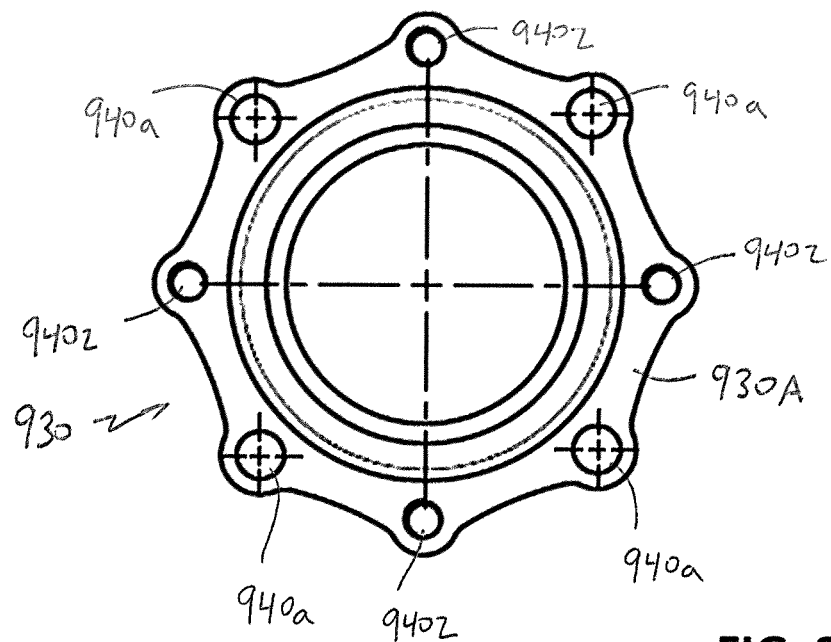
Figure 31B:
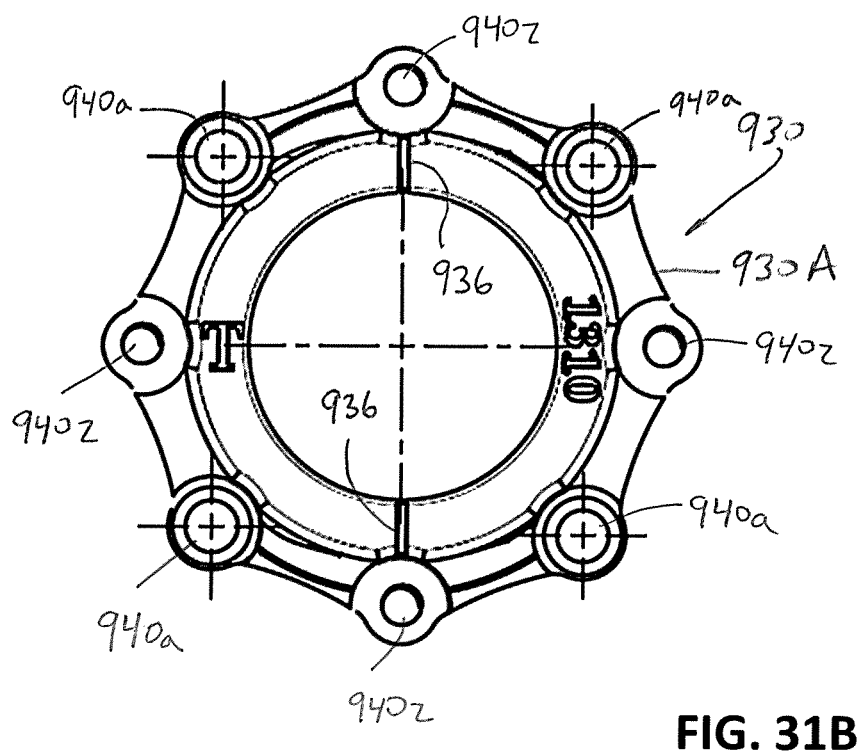
Figure 31C:
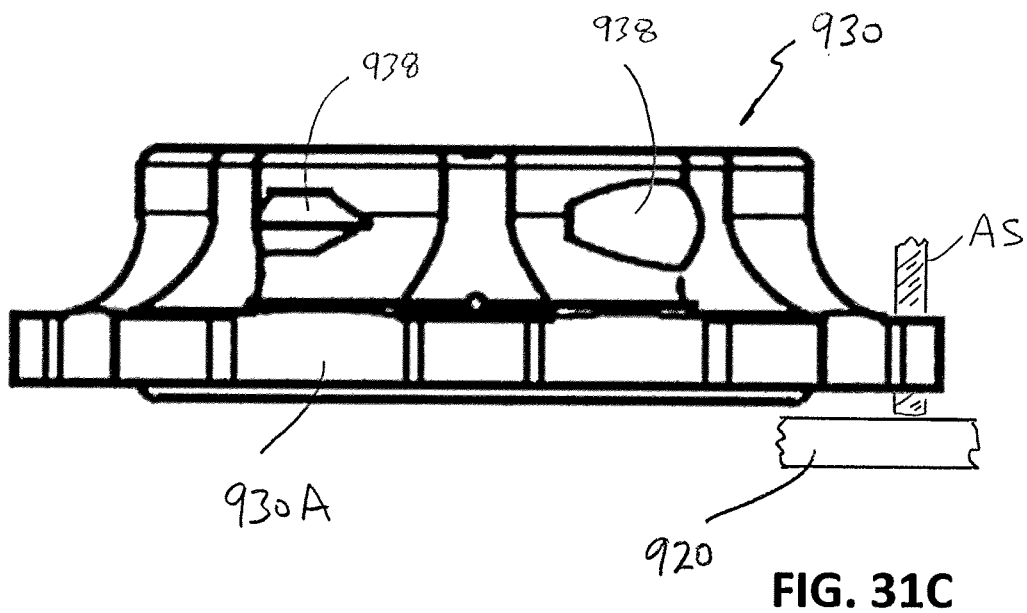
Figure 31D:
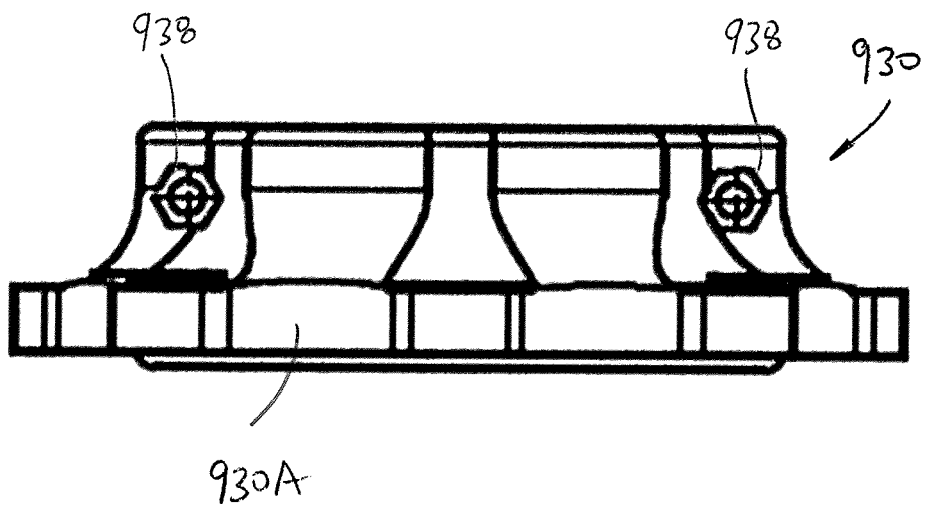

Depending on the particular end-use, one skilled in the art will appreciate that a length of the arm 542 of a particular WEIT 510 may vary from one version to another. This is more particularly illustrated in FIGS. 23 and 24 that show two further embodiments of WEITs 610, 710 that each include an integrated, one-piece collar or dome 630 or 730/base plate 620 or 720, respectively, having shorter arms 642 (FIG. 23), 742 (FIG. 24) than the embodiment of FIGS. 19-22. Moreover, the conformation of the arms 542, 642, 742, collar portions 530, 630, 730, and base plate portions 520, 620, 720 may vary from one version of a WEIT to another as represented by the differences in these embodiments. Still another modification and difference between these different embodiments relates to the conformation of the slit 536, 636, 736. Each embodiment, however, permits the integrated collar/base plate of the WEIT to be selectively tightened on the spindle in a manner as previously described.

FIGS. 25-28 illustrate a drive axle 800 that receives a drive axle alignment member or spear 880 in order to orient or align the spindle repair tools. That is, alignment and/or mounting of the spindle repair tools with the drive axle 800 is facilitated with the drive axle alignment member 880 coordinating with the spindle repair tools, e.g., backing plate 804, base plate 820 spacer legs 812, jig/crown 830, etc. (spindle tools), of the present disclosure.

FIGS. 29A-31D disclose an alternative embodiment for a WEIT plate or base plate 920 and crown 930. The base plate 920 and crown 930 are similar to the base plates and crowns described above except as otherwise shown and/or described. In this embodiment, the base 930A of the annular crown 930 includes multiple apertures 940*a* (e.g., four apertures 940*a* in the illustrated example) for receiving fasteners that are respectively also received in aligned apertures 940*b* in the base plate 920 for securing the crown 930 (and the associated spindle 106, 306 to which the crown 930 is connected) to the base plate 920. Unlike other embodiments, the crown 930 also includes multiple (e.g., three or four) threaded adjustment apertures 940*z* for respectively receiving corresponding threaded adjustment screws AS (see FIG. 31C). When the crown 930 is loosely connected to the base plate 920 (using fasteners installed in the aligned apertures 940*a*, 940*b* but before such fasteners are fully tightened), the adjustment screws AS can be threadably advanced or retracted in their respective adjustment apertures 940*z* such that the adjustment screws AS bear against the base plate 920 and alter the alignment of the crown 930 (and spindle 106, 306 to which the crown 930 is connected) relative to the base plate 920. After the adjustment process via adjustment screws AS is completed, the crown 930 can then be fully connected to the base plate 920 by tightening the fasteners that are installed in the aligned apertures 940*a*, 940*b*. As shown in FIGS. 30A and 31B, as with prior embodiments, the crown 930 includes at least one split 936 (two splits 936 are shown) that extend at least partially or fully through the radial dimension of the crown 930. Each split 936 can be selectively closed or compressed circumferentially by a fastener installed in the fastener receiving regions 938 of crown 930 as described above to clamp the crown 930 onto an associated spindle 106, 306.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept or that do not differ from the literal language of the claims, or if they include equivalent structural elements with insubstantial differences from the same concept or from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

Although specific advantages have been enumerated above, various embodiments may include some, none, or all of the enumerated advantages. Although exemplary embodiments are illustrated in the figures and description herein, the principles of the present disclosure may be implemented using any number of techniques, whether currently known or not. Moreover, the operations of the systems and apparatuses disclosed herein may be performed by more, fewer, or other components, and the methods described herein may include more, fewer, or other steps. Additionally, steps may be performed in any suitable order.

To aid the Patent Office and any readers of this application and any resulting patent in interpreting the claims appended hereto, applicants do not intend any of the appended claims or claim elements to invoke 35 USC 112(f) unless the words "means for" or "step for" are explicitly used in the particular claim.

What is claimed is:
1. A method of repairing a damaged brake backer plate comprising:

removing a damaged brake backer plate from an axle tube that includes a spindle;

attaching a leg to a replacement brake backer plate;

attaching a wheel end interface tool to the leg to connect the wheel end interface tool to the replacement brake backer plate;

sliding the replacement brake backer plate and wheel end interface tool connected thereto over the spindle of the axle tube;

securing the replacement brake backer plate onto the axle tube;

separating the wheel end interface tool from the replacement brake backer plate and removing the wheel end interface tool from the spindle.

2. The method as set forth in claim 1, wherein said step of securing the replacement brake backer plate onto the axle tube comprises tack welding.

3. The method as set forth in claim 2, further comprising further welding the replacement brake backer plate to the axle tube after said tack welding.

4. The method as set forth in claim 1, wherein said wheel end interface tool comprises a base plate and a crown connected to the base plate.

5. The method as set forth in claim 4, wherein said crown comprises a split and wherein said step of sliding the replacement brake backer plate and wheel end interface tool connected thereto over the spindle of the axle tube further includes securing the crown to the spindle after said step of sliding the replacement brake backer plate and wheel end interface tool connected thereto over the spindle by selectively advancing a fastener across a split formed in the crown.

6. The method of claim 4, further comprising attaching said crown to said base plate by at least one of: (i) engaging cam surfaces with corresponding retainers; (ii) engaging fasteners with said crown and said base plate.

* * * * *